No. 762,206. PATENTED JUNE 7, 1904.
J. SHELTON.
BODY BOLSTER.
APPLICATION FILED FEB. 19, 1904.
NO MODEL.
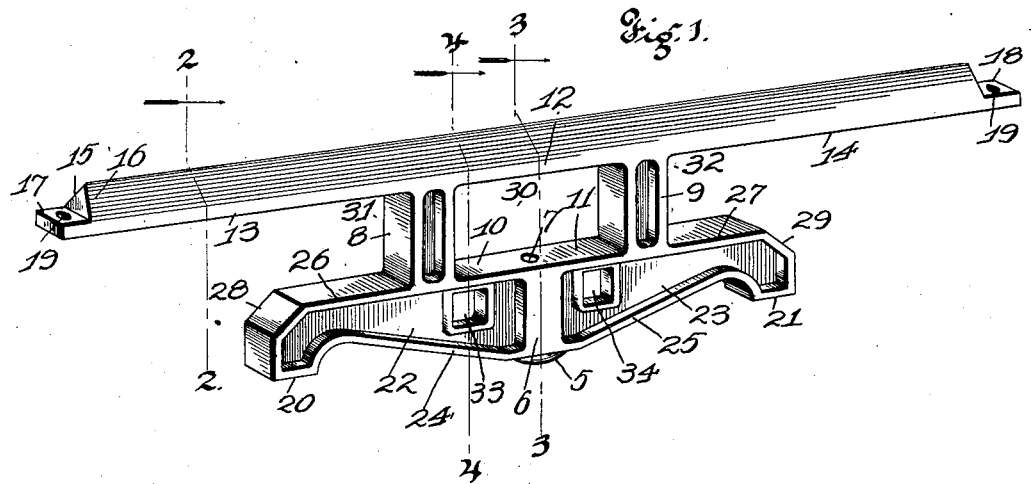
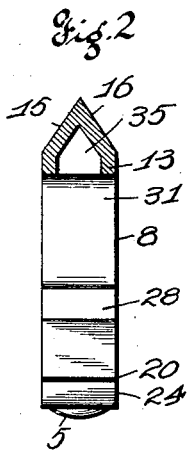 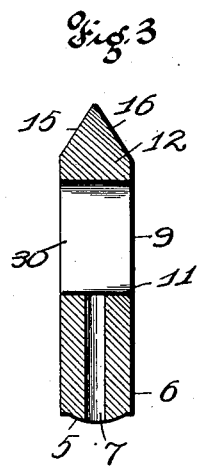 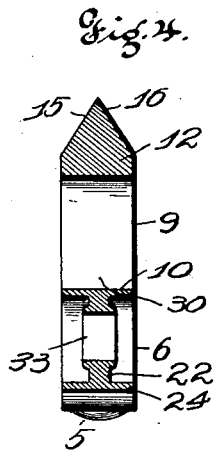
Witnesses
Alfred A. Eicks
Edw. M. Harrington
Inventor
John Shelton
by Higdon & Longan & Hopkins Attys.
THE NORRIS PETERS CO., PHOTO-LITHO., WASHINGTON, D. C.

No. 762,206.

Patented June 7, 1904.

UNITED STATES PATENT OFFICE.

JOHN SHELTON, OF ST. LOUIS, MISSOURI.

BODY-BOLSTER.

SPECIFICATION forming part of Letters Patent No. 762,206, dated June 7, 1904.

Application filed February 19, 1904. Serial No. 194,374. (No model.)

*To all whom it may concern:*

Be it known that I, JOHN SHELTON, a citizen of the United States, residing at St. Louis, State of Missouri, have invented certain new and useful Improvements in Body-Bolsters, of which the following is a specification containing a full, clear, and exact description, reference being had to the accompanying drawings, forming a part hereof.

My invention relates to body-bolsters; and it consists of the novel features herein shown, described, and claimed.

In the drawings, Figure 1 is a perspective of my improved body-bolster. Fig. 2 is a cross-section on the line 2 2 of Fig. 1 and looking in the direction indicated by the arrow. Fig. 3 is a cross-section on the line 3 3 of Fig. 1 and looking in the direction indicated by the arrow. Fig. 4 is a cross-section on the line 4 4 of Fig. 1 and looking in the direction indicated by the arrow.

Referring to the drawings in detail, my improved body-bolster comprises: the bearing-plate 5, adapted to engage the truck-bolster; the king-bolt casing 6, extending upwardly from the bearing-plate and having the king-bolt opening 7 at its center; the supporting-plates 10 and 11, extending horizontally from the upper part of the king-bolt casing; the pedestals 8 and 9, extending upwardly from the supporting-plates; the brace-plate 12, connecting the upper ends of the pedestals; the body-supporting arms 13 and 14, extending laterally from the upper ends of the pedestals, said arms 13 and 14 having inclined upper faces 15 and 16 and the outer ends 17 and 18 of said arms being flattened, so as to adapt the arms for connection to the body side sills, there being openings 19 through said flat ends through which bolts may be inserted into the side sills; side bearing-arms 20 and 21, connected to the pedestals, to the king-bolt casing, and to the bearing-plate, said arms comprising the webs 22 and 23, the lower flanges 24 and 25, and the upper flanges 26 and 27 and the outer ends of said arms having the inclined upper faces 28 and 29 to form door-stops, there being the space 30 between the pedestal 8 and 9 on the sides and between the supporting-plates 10 and 11 on the bottom and the brace 12 on the top to receive the central body-sills, and there being spaces 31 and 32 outside of the pedestals between the arms 13 and 20 on one side and between 14 and 21 on the other side to receive the intermediate body-sills, and there being openings 33 and 34 through the webs 22 and 23 to receive the draft-timbers.

I prefer to make the arms 13 and 14 substantially A-shaped in cross-section, as shown in Fig. 2, the spaces 35 being formed from the lower faces of said arms by coring.

My improved body-bolster is intended, primarily, to be used in the construction of dump-cars, such as I have shown, described, and claimed in a companion application for dump-cars, filed January 2, 1904, Serial No. 187,477, and patented March 8, 1904, No. 754,351.

The doors of the dump-car will swing upwardly against the arms 13 and 14 when closed and downwardly against the stops 28 and 29 when open.

I claim—

1. A body-bolster comprising: a bearing-plate; a king-bolt casing extending upwardly from the bearing-plate; supporting-plates extending horizontally from the king-bolt casing; pedestals extending upwardly from the supporting-plates; side bearing-arms extending outwardly from the lower ends of the pedestals; and body-supporting arms extending outwardly from the upper ends of the pedestals; all cast integral; substantially as specified.

2. A body-bolster comprising: a bearing-plate; a king-bolt casing extending upwardly from the bearing-plate; supporting-plates extending horizontally from the king-bolt casing; pedestals extending upwardly from the supporting-plates; a brace-plate connecting the upper ends of the pedestals; side bearing-arms extending outwardly from the lower ends of the pedestals; and body-supporting arms extending outwardly from the outer ends of the pedestals; all cast integral; substantially as specified.

3. A body-bolster comprising: a bearing-plate; a king-bolt casing extending upwardly from the bearing-plate; supporting-plates extending horizontally from the king-bolt casing; pedestals extending upwardly from the supporting-plates; and body-supporting arms extending outwardly from the upper ends of the pedestals, the upper faces of said arms being inclined; substantially as specified.

4. A body-bolster comprising: a bearing-plate; a king-bolt casing extending upwardly from the bearing-plate; supporting-plates extending horizontally from the king-bolt casing; pedestals extending upwardly from the supporting-plates; and body-supporting arms extending outwardly from the upper ends of the pedestals, said arms being A-shaped in cross-section; substantially as specified.

5. A body-bolster comprising: a bearing-plate; a king-bolt casing extending upwardly from the bearing-plate; supporting-plates extending horizontally from the king-bolt casing; pedestals extending upwardly from the supporting-plates; and body-supporting arms extending outwardly from the upper ends of the pedestals, the extreme outer ends of said arms being flat to receive the side sills; and the intermediate portions of said arms having inclined upper faces; substantially as specified.

6. A body-bolster comprising: a bearing-plate; a king-bolt casing extending upwardly from the bearing-plate; supporting-plates extending horizontally from the king-bolt casing; pedestals extending upwardly from the supporting-plates; body-supporting arms extending outwardly from the upper ends of the pedestals; and side bearing-arms extending horizontally from the king-bolt casing; there being draft-timber openings below the supporting-plates; substantially as specified.

7. In a body-bolster: horizontal supporting-plates; pedestals extending upwardly from the outer ends of the supporting-plates; there being space between said pedestals for the central body-sills; and body-supporting arms extending outwardly from the upper ends of the pedestals; substantially as specified.

8. In a body-bolster: horizontal supporting-plates; pedestals extending upwardly from the outer ends of the supporting-plates; there being space between said pedestals for the central body-sills, and there being space outside of said pedestals for the intermediate body-sills; body-supporting arms extending outwardly from the outer ends of the pedestals; and a brace connecting the upper ends of the pedestals; substantially as specified.

9. In a body-bolster: horizontal supporting-plates; pedestals extending upwardly from the outer ends of the supporting-plates; body-supporting arms extending outwardly from the upper ends of the pedestals; the intermediate portions of said arms being A-shaped in cross-section; and a brace connecting the upper ends of the pedestals; there being an opening between the pedestals on the sides and between the supporting-plates on the bottom and the brace on the top to receive the central body-sills; substantially as specified.

10. In a body-bolster: supporting-plates; pedestals extending upwardly from the ends of the supporting-plates; a brace connecting the upper ends of the pedestals; and body-supporting arms extending outwardly from the upper ends of the pedestals in alinement with the brace; the upper faces of said brace and said arms being inclined; substantially as specified.

11. In a body-bolster: supporting-plates; pedestals extending upwardly from the ends of the supporting-plates; a brace connecting the upper ends of the pedestals; and body-supporting arms extending outwardly from the upper ends of the pedestals in alinement with the brace; the upper faces of said brace and said arms being inclined, and the extreme outer ends of said arms being flat; substantially as specified.

12. In a body-bolster: supporting-plates; pedestals extending upwardly from the outer ends of the supporting-plates; body-supporting arms extending outwardly from the upper ends of the pedestals; and side bearing-arms extending outwardly from the lower ends of the pedestals; there being spaces between the body-supporting arms and the side bearing-arms to receive the intermediate sills; substantially as specified.

13. In a body-bolster: a king-bolt casing; vertical pedestals, one on each side of the king-bolt casing and connected thereto; and body-supporting arms extending outwardly from the upper ends of the pedestals; said body-supporting arms being A-shaped in cross-section; substantially as specified.

14. In a body-bolster: a king-bolt casing; side bearing-arms extending horizontally from the king-bolt casing, there being openings through said arms to receive the draft-timbers; pedestals extending upwardly from said arms at points intermediate of their outer-ends; body-supporting arms extending outwardly from the upper ends of the pedestals, so that the central sills may be located between the pedestals, and the intermediate sills outside of the pedestals between the side bearing-arms and the body-supporting arms; substantially as specified.

15. In a body-bolster: a king-bolt casing; side bearing-arms extending horizontally from the king-bolt casing; the outer ends of said side bearing-arms being adapted to act as door-stops; pedestals extending upwardly; and body-supporting arms extending outwardly from the upper ends of the pedestals; substantially as specified.

16. In a body-bolster: side bearing-arms; means of connecting the side bearing-arms and adapted to be connected to the truck; pedestals extending upwardly from the side bearing-arms; and body-supporting arms extending outwardly from the upper ends of the pedestals, so that the central sills may be located between the pedestals, and the intermediate sills located outside of the pedestals between the side bearing-arms and the body-supporting arms; substantially as specified.

In testimony whereof I have signed my name to this specification in presence of two subscribing witnesses.

JOHN SHELTON.

Witnesses:
ALFRED A. EICKS,
M. M. BRAZILL.